Feb. 9, 1960  H. ORNER  2,924,113
BALL BEARING SCREW AND NUT MECHANISM
Original Filed July 30, 1953  3 Sheets-Sheet 1
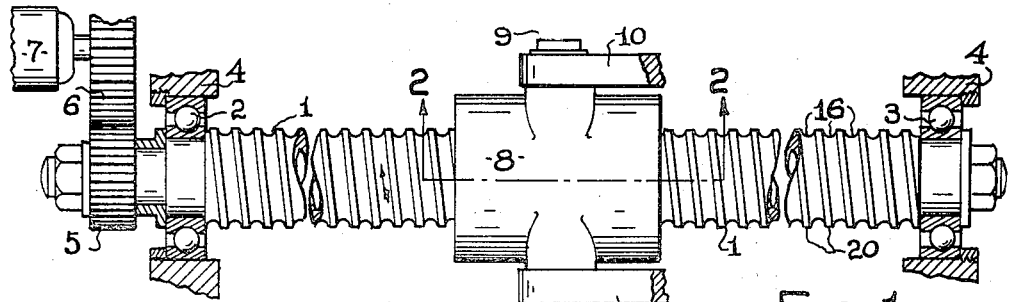
FIG. 1
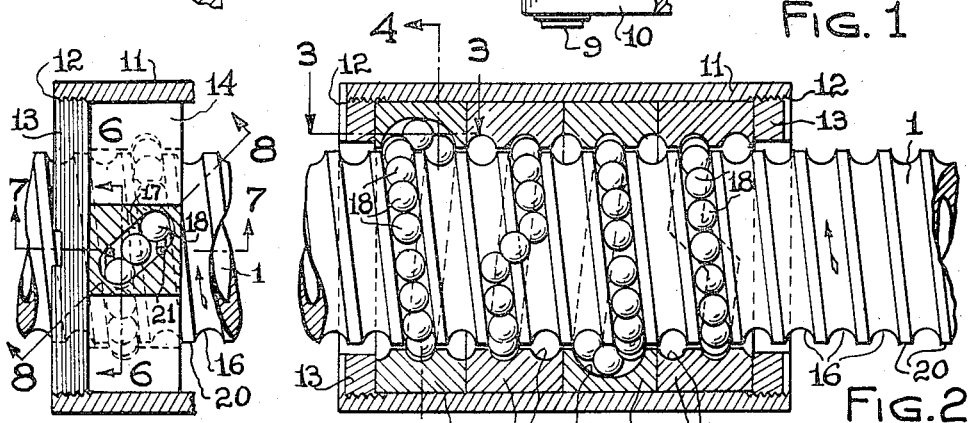
FIG. 2
FIG. 3
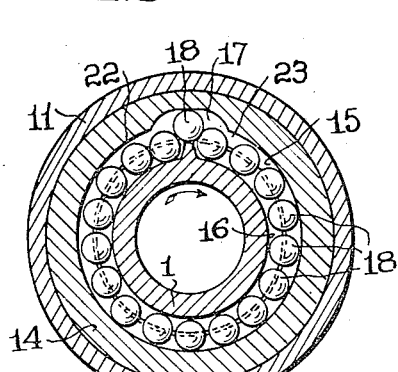
FIG. 4
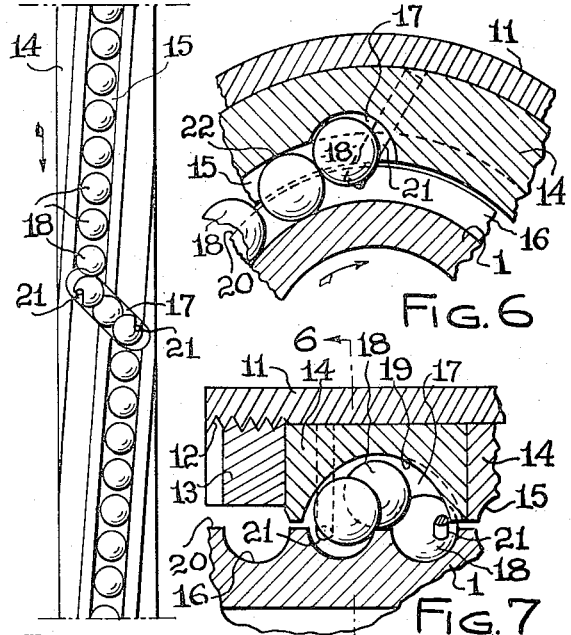
FIG. 5
FIG. 6
FIG. 7
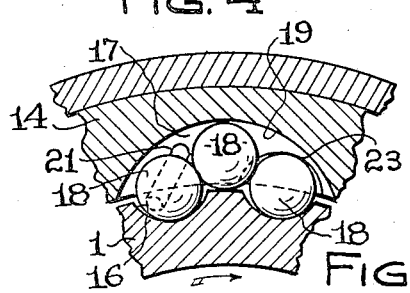
FIG. 8
INVENTOR:
Harry Orner

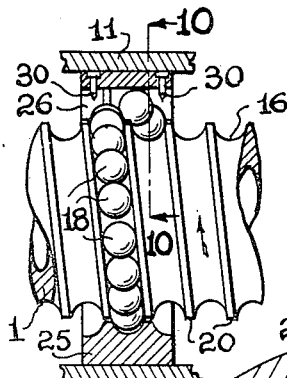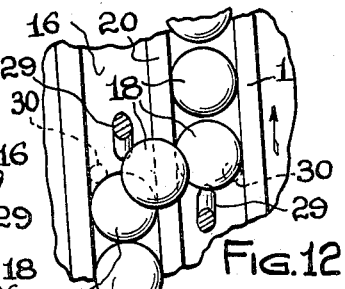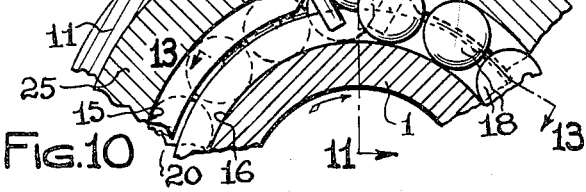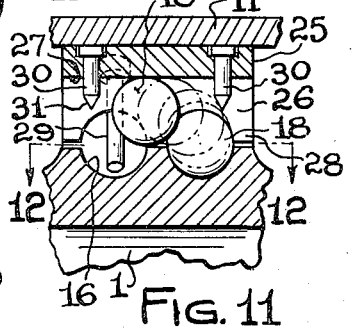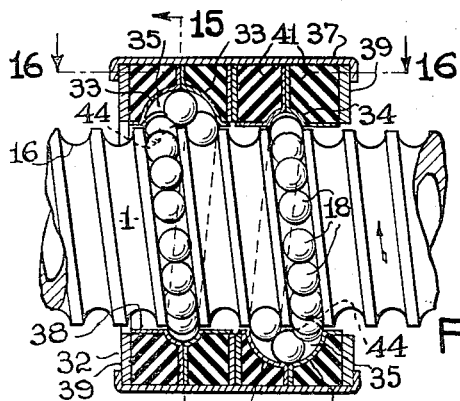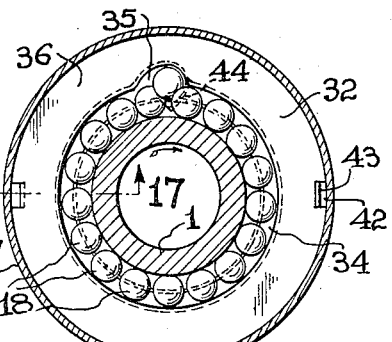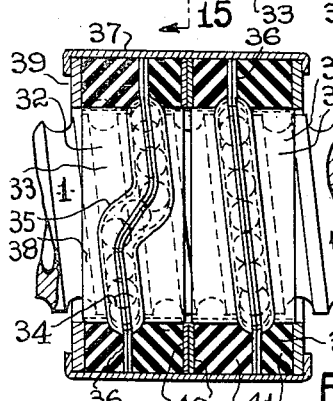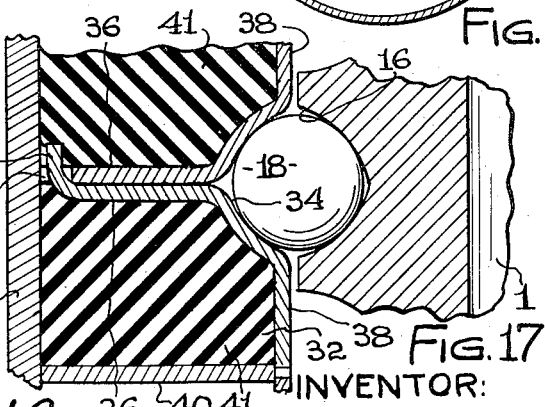

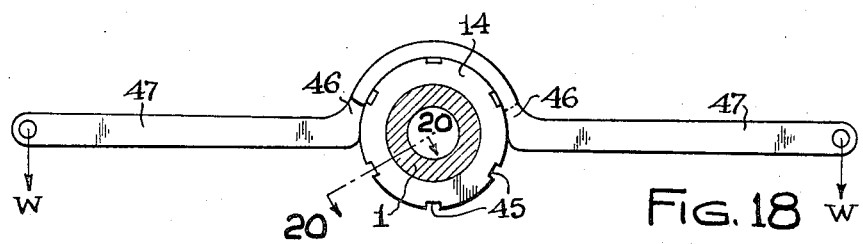
Fig. 18
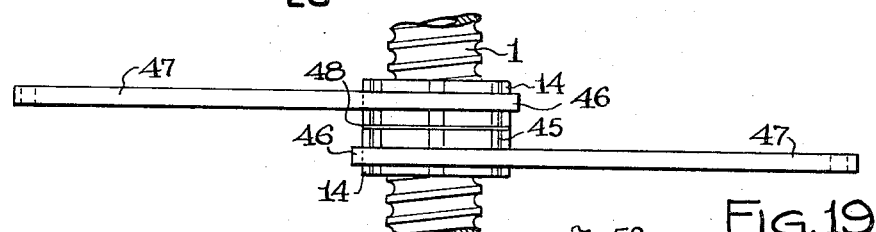
Fig. 19
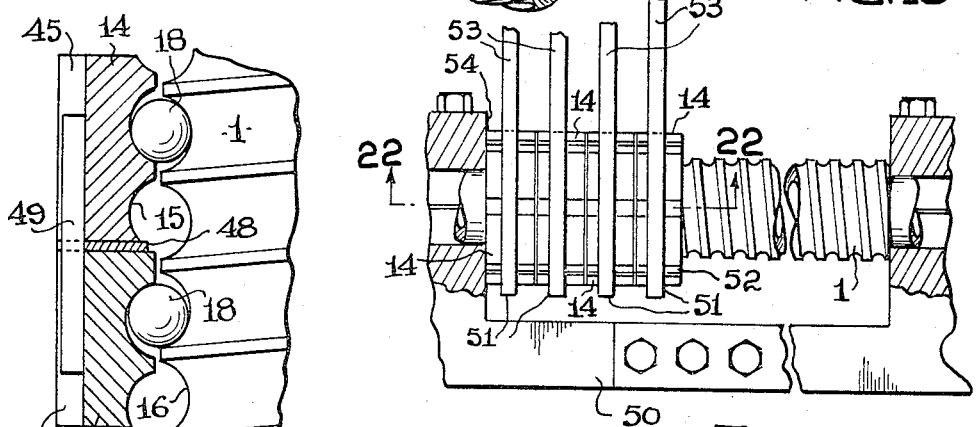
Fig. 20
Fig. 21
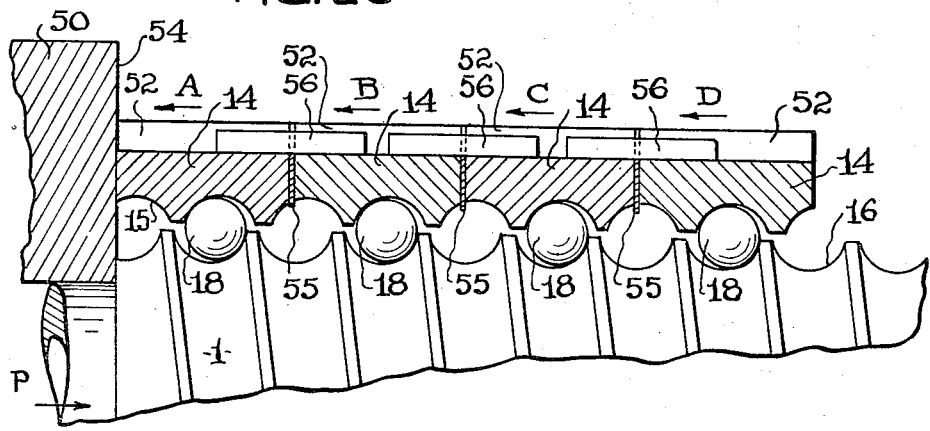
Fig. 22
INVENTOR:
Harry Orner United States Patent Office 2,924,113
Patented Feb. 9, 1960

2,924,113

BALL BEARING SCREW AND NUT MECHANISM

Harry Orner, Altadena, Calif.

Original application July 30, 1953, Serial No. 371,253. Divided and this application November 13, 1958, Serial No. 773,668

14 Claims. (Cl. 74—459)

This invention relates to recirculating ball-bearing screw and nut mechanisms for changing rotary to linear, or linear to rotary, motion by means of rolling balls. The invention also relates to methods of eliminating end play, and effecting load dividing, in such mechanisms.

This application is a division of my co-pending application Serial No. 371,253, filed July 30, 1953, for Ball Bearing Screw and Nut Mechanism.

The ball-bearing screw and nut mechanisms as known heretofore consisted of a screw and nut with balls distributed on the spiral race of the nut to carry a linear load by the rolling action of the balls. A return tube connecting the ends of the race in the nut serves to recirculate the balls back to the beginning of the race. This return tube complicates the mechanism and limits the functional and economical use of the device.

One of the primary objects of this invention is to provide an improved ball-bearing screw and nut mechanism eliminating the return tube construction.

Another object of this invention is to provide a ball-bearing screw and nut mechanism employing single turn recirculating paths for higher loading and better efficiency.

Another object of this invention is to provide a ball-bearing screw and nut mechanism that automatically spaces the balls on the spiral race of the nut to eliminate the rubbing friction between the balls.

Another object of this invention is to provide a ball-bearing screw and nut mechanism of economical construction.

Another object of this invention is to provide a ball-bearing screw and nut mechanism incorporating separate and individual circulating systems assembled into a single articulate nut structure.

Another object of this invention is to provide a ball-bearing screw and nut mechanism incorporating individual circulating systems assembled into a nut in such a way as to eliminate end play, and to provide a method of effecting such assembly.

Another object of this invention is to provide a ball-bearing screw and nut mechanism incorporating individual circulating systems assembled into a nut in such a way as to control the distribution of the loads on the balls, and to provide a method of effecting such assembly.

Other objects and advantages will become more fully apparent as reference is had to the accompanying drawings wherein my invention is illustrated and in which:

Figure 1 is a general view illustrating one preferred embodiment of my invention;

Figure 2 is an enlarged sectional view taken on the plane 2—2 of Figure 1;

Figure 3 is a sectional view taken on the plane 3—3 of Figure 2;

Figure 4 is a sectional view taken in part along a plane passing through the circulating balls as is indicated by line 4—4 on Figure 2;

Figure 5 is a developed view of the inside circumference of one of the circulating circuits of the nut;

Figures 6, 7 and 8 are enlarged views taken on the planes 6—6, 7—7, and 8—8, respectively, of Figure 3;

Figure 9 is a fragmentary sectional view through a single nut of another embodiment of the ball screw mechanism and showing a different pin arrangement in the ball return passage;

Figure 10 is an enlarged sectional view taken on the plane 10—10 of Figure 9;

Figure 11 is a sectional view taken on the plane 11—11 of Figure 10;

Figure 12 is a sectional view taken on the plane 12—12 of Figure 11;

Figure 13 is a fragmentary view taken on the circumference of the screw, on the line 13—13 of Figure 10;

Figures 14 to 17, inclusive, illustrate another modified form of this invention, of which Figure 14 is a partial longitudinal section illustrating two independent recirculating systems;

Figures 15 and 16 are partial sectional views taken along the planes generally indicated by lines 15—15 and 16—16, respectively, on Figure 14, it being pointed out that plane 16—16 is curved about the screw axis and that certain of the parts are cut away for purposes of clarity;

Figure 17 is an enlarged fragmentary sectional view taken on the plane 17—17 of Figure 15;

Figures 18 to 20, inclusive, illustrate the method of preloading the improved ball-bearing screw and nut mechanism to remove all end play, of which Figure 18 is an end elevational view of the nut, with the screw in section;

Figure 19 is a plan view of the showing of Figure 18;

Figure 20 is an enlarged fragmentary sectional view taken on the plane 20—20 of Figure 18;

Figures 21 and 22 illustrate the method of distributing the load on the balls of a series of ball bearing screw and nut circulating systems, of which Figure 21 is a plan view partially in section; and Figure 22 is an enlarged fragmentary sectional view taken on plane 22—22 on Figure 21.

Referring to Figures 1 to 8, inclusive, and particularly to Figure 1, there is shown a ball-bearing screw 1 supported rotatably in bearings 2 and 3 mounted in a housing 4. A gear 5 fixed to the screw 1 is driven by a gear 6 on a motor 7. This illustrates a rotary source of power to actuate the screw 1. A ball-bearing nut 8 mounted on the screw 1 has trunnions 9 with links 10 mounted thereon. Links 10 may be used to actuate an aircraft landing gear, or any mechanism that requires a linear movement. It is also feasible to rotate nut 8 by a source of power and actuate the screw 1 linearly. It is also feasible to actuate either the nut or screw by a linear source of power and derive rotary motion from the other member.

Referring more particularly to Figure 2, the nut 8 consists of a tubular housing 11 with internal threads 12 on each end to receive an end ring or nut 13. Fitted into the housing 11 are a plurality of nut segments 14 retained therein by the end rings 13. On the internal circumference of each nut segment 14 is a helical or spiral ball groove 15 of contour and lead similar to helical or spiral ball groove 16 on the screw 1. This spiral ball groove 15 of each nut segment 14, see Figures 4 and 5, comprises approximately one complete turn terminating at a recirculating groove 17, the latter connecting the ends of ball groove 15 in such manner as to form a closed circuit.

The spiral ball groove 15 and recirculating groove 17 of each nut segment 14 are nearly filled with balls 18, The balls 18 mate with the spiral ball groove 16 of the screw and spiral ball groove 15 of the nut in such manner that any rotary motion of the screw 1 or nut segment 14 will actuate the other member linearly by the rolling action of the balls. The rolling action of the balls transmits force with a smaller coefficient of friction than the rubbing action of conventional nut and screw threads. It is preferred that grooves 15 and 16 have rounded bottoms corresponding to the ball curvature.

The groove 17 forming the recirculating branch of the circuit consists of an arcuate wall 19, see Figure 8, formed between the ends of one turn of groove 15 of the nut segment 14. Groove 17 extends over the outside diameter or crest 20 of the screw 1 and forms a free return path for the balls 18. The recirculating groove 17 is sloped at an angle, relative to the screw axis, to facilitate this recirculation of the balls 18.

To further facilitate movement of the balls 18 over the ridge forming the outside diameter or crest 20 of the screw, pins 21 are mounted in the nut segment 14, see Figures 6 and 7, at an angle and extending into groove 16 of the screw 1. Pins 21 cause the balls 18 to be rolled up on the pins 21 and the edges of the groove 16 to bring the balls to the level of the outside diameter or thread crest 20 of the screw 1. The pins 21 are mounted in similar positions at the ends of the spiral ball groove 15 and recirculating groove 17 so that similar actuation of the balls 18 can be obtained in either direction of rotation of nut segment 14 or screw 1.

Upon rotation of the screw 1 clockwise when viewed from the right end of Figures 1 and 2, with a load on the left end of the nut 8, the balls 18 are compressed in the spiral ball grooves 15 and 16 and roll in a clockwise direction. When a ball 18 reaches the recirculating groove 17 it becomes free of any rolling action and relies for its motion on the push of the ball 18 to the rear of it. The free ball 18 is pushed, see Figures 6 and 7, on pin 21 and the edge of the spiral ball groove 16 until it reaches the level of the outside diameter 20 of the screw 1. Such pushing is continued until the free ball again reaches spiral ball grooves 15 and 16 but approximately one turn back, being guided by the other pin 21 and the arcuate wall 19. When it thus reaches the other end of groove 17 and is fed back into the spiral ball grooves 15 and 16, it is again compressed by the load and rolled by the power of the rotating screw 1.

The free balls 18 in the recirculating groove 17 will take an arcuate path, being moved by the last rolling ball 18 still in the spiral ball grooves 15 and 16 at the area or turn end 22, see Figures 4 and 6. When the last free ball 18 enters spiral grooves 15 and 16 at the area or turn end 23, see Figures 4 and 8, it is pushed by the last free ball which is at an elevated position near the outside diameter or crest 20 of screw 1. As this ball is compressed and actuated by the screw, the next free ball must be moved down in the arcuate path. This arcuate path is longer than the distance moved by the last ball being actuated in the grooves 15 and 16, which moves out of contact the free ball 18, thus forming a small space between the balls 18 as they are fed back into the grooves 15 and 16. Since in the grooves 15 and 16 the balls are maintained under compression between the screw 1 and nut segment 14, they will maintain their relative spaced-apart positions, as indicated. This prevents rubbing of the balls in the circulating grooves 15 and 16 and thus results in better efficiency in power transmittal.

Referring to Figures 9 to 13, inclusive, there is shown a modified form of my invention, having a nut segment 25 constructed with a different recirculating groove 26. All the other parts are the same and have been given the same reference characters. The recirculating groove 26 is drilled, cut or formed longitudinally of the axis of the nut segment 25 and on the inside periphery thereof. The groove 26 has an arcuate bottom wall 27 of a depth just sufficient to freely pass a ball 18 longitudinally over the outside diameter of crest 20 of the screw 1, and has inclined side walls 28 extending to the inside diameter of nut 25. Pins 29 secured in the nut extend into the spiral ball groove 16 of the screw 1 at an angle parallel to the inclined walls 28 opposed thereto. The pins 29 each are spaced from the associated wall 28 to freely permit a ball 18 to roll therebetween, and extend in the direction of the circulating balls. To prevent the balls 18 from rolling axially out of the ends of the recirculating groove 26, pins 30 are secured in nut segment 25 and extend radially inwardly to the axis of groove 26. The pins 30 each have a beveled end 31 located to guide the balls 18 as they are rolled up or down the pins 29 as before indicated.

The balls 18, when rolled by the force of screw 1, enter the recirculating groove 26 as free balls. They are then pushed by the following compressed ball onto a pin 29, thus being confined by the pin 29, the edge of the spiral ball groove 16, and the inclined wall 28, until they reach a pin 30 which guides them longitudinally of groove 26 over the ridge formed by the outside diameter or crest 20 of screw 1. They are then pushed freely until stopped by the other pin 30, and are guided on the second pin 29 back into circulating spiral ball grooves 15 and 16. The action of spacing the balls 18 in the circulating grooves occurs as was stated relative to the first form of my invention.

The pin structure shown in Figures 9 to 13 is highly advantageous since it permits the use of a groove 26 which extends longitudinally of the nut and may be formed very economically such as by drilling. There is thus no need for special castings or liners, and the cost of the unit is reduced greatly without impairing its quality or performance. Furthermore, assembly of the unit is greatly facilitated since insertion of the pins is extremely simple as compared to mounting of the special ball deflector members previously employed.

Referring to Figures 14 to 17, inclusive, there is shown another form of my invention in which the nut segments 32 are formed from sheet metal stampings or any other fabrication, supported in rubber. All the other parts are similar and have been given the same reference characters.

Each nut segment 32 is made of two similar halves split radially generally along the axis of recirculating groove 35 and the spiral ball groove 34. Each half 33 of the nut segment 32 consists of a radial flange 36, extending to the housing 37, and tubular walls 38 extending over the screw 1. An external washer 39, an internal washer 40, the flange 36, the tubular wall 38, and the housing 37 form a closed chamber filled with rubber material 41, the latter serving to sustain the structure. Rubber is known for its characteristic of being substantially non-compressible, yet being easy to stretch or displace. The rubber 41 will sustain or support the stamping 33 in position under load yet permit a certain controlled amount of displacement or stretching, so as to conform to the rolling balls 18 in the spiral ball groove 16 of screw 1.

The ball 18, see Figure 17, rolled by the compressive force of the load is circulated in groove 34 formed by the two halves 33 and may force such halves apart by displacing the rubber 41 slightly. The two halves 33 are retained against rotation relative to each other by means of a notch 42 and a tab 43 on adjacent flanges 36.

The recirculating groove 35 is formed in the nut segment 32 with smooth curves to guide the balls 18 over the outside diameter or crest 20 of screw 1. A lip 44 at each end of the recirculating groove 35 extends partially into spiral ball groove 16 of the screw 1 to lift the balls 18 into the recirculating groove 35.

Three forms of an improved recirculating ball-bearing screw and nut mechanism have been illustrated, each having a single turn circulating cycle with an internal cavity, groove or port to recirculate the balls in the load grooves. Thus there has been provided ball-bearing nut segments capable of being assembled into a nut in various manners to control certain characteristics adaptable for definite requirements.

These are many mechanisms in which end play, that is to say relative longitudinal shifting between the nut and the screw, may not be tolerated. This is particularly true in certain high load applications, such as in aircraft, where it is important that the balls and the groove walls correspond in curvature in order to minimize deformation of the balls due to the high stresses present. Such deformation of the balls is minimized when the groove walls are curved to engage the balls over a considerable arc, as shown in Figure 17, for example.

This invention includes a method of preloading the balls 18 relative to the required condition of the mechanism. Referring to Figures 18 to 21, inclusive, there is shown a screw 1 with two nut segments 14, filled with balls 18. A number of longitudinal keyways 45 are provided on the outside circumference of each nut segment 14. Spanner wrenches 46 are fitted in the keyways 45 in a position to rotate the nut segments 14 toward each other. The handles 47 of the wrenches 46 extend outward, and at a predetermined distance, loads W are applied. The resulting torque on the wrenches 46 caused by loads W will force the nut segments 14 toward each other by the rolling action of the balls 18, with the result that the balls 18, see Figure 20, are loaded in opposite directions taking up all the free end movement of the nut segments 14 relative to the screw 1. The magnitude of the torque created by the loads W is calculated relative to the longitudinal load for which the mechanism is designed, and the spiral angle of the ball grooves. A shim 48 can be inserted between the nut segments 14 and of such thickness that a pair of keyways 45 will be aligned when the pre-calculated torque is applied. A key 49 is then inserted to lock the two nuts in place.

The two nut segments 14 are thus preloaded to the required value, and the load W and the wrenches 46 can be removed. The design load, when applied to either the nut segment 14 or the screw 1 in either direction, would relieve one cycle of balls 18 of all load and the opposite balls would take the load without any end play.

Thus nut segments 14, and likewise nut segments 25 and 32, can be preloaded at assembly to remove all free end play, and any number of such units can be used in a nut 8 of Figure 1.

This invention also includes an improved method of loading the balls 18 so that the load carried by each ball approaches a uniform value. Referring to Figures 21 and 22, a number of nut segments 14 having keyways 52 thereon, are shown as assembled on a screw 1. A holding fixture 50 is provided to hold the screw 1 against rotation and to form a stop for the nuts as the method is performed. Spanner wrenches 51, each similar to the wrench 46 of Figure 18, are mounted on the nut segments 14 and loads are applied on the wrench handles 53. The resulting torque causes the nut segments 14 to be rotated on screw 1 until the first nut segment 14 abuts the wall 54 with a predetermined force A, see Figure 22. The second nut segment 14 is then caused to abut the first nut with a force B, and each nut segment 14 thereafter abuts the adjacent nut with such forces C and D. The sum of the forces A, B, C, and D will equal in value the load P on the screw 1. If the values of A, B, C and D are predetermined by applying pre-calculated (for example, equal) torque values on the wrenches 51, the load on all the compressed load balls will be distributed as desired.

Shims 55 may be inserted between the nut segments 14 at this loading to align the keyways 52 as before. Keys 56 are then inserted to fix the nut segments in place. The wrenches 51 can then be removed from the nuts, and the screw 1 removed from the fixture 50. The nut segments 14 are now fixed against rotation relative to each other by the keys 56 to cause a predetermined (preferably equal) distribution of the load P on all the loaded balls 18, and the segments 14 can be assembled into a nut 8 of Figure 1.

Thus it has been shown that the nut segments 14, and likewise nut segments 25 and 32, can be manipulated on the screw 1 to load the balls 18 uniformly to carry an applied load.

In numerous respects, as is apparent, my invention is not limited to the exact details of construction illustrated and described. Various changes and modifications may be made, without departing from the spirit of my invention or the scope of the appended claims.

I claim:

1. A ball bearing screw and nut mechanism, comprising a screw having an external helical groove, a nut formed with an internal helical groove, said grooves cooperating with each other to form a single turn helical ball race, a plurality of balls mounted in said race, a conduit formed generally longitudinally in said nut and opening at its ends to the adjacent opposite ends of said single turn ball race, and a pair of deflector pins mounted at each junction of said race with said conduit end, one pin of each of said pairs being disposed to shift said balls out of said races and the other pin of each of said pairs being disposed to close one axial end of said conduit adjacent a face of said nut.

2. The invention as defined in claim 1 characterized in that said other pin of each of said pairs is shaped and disposed to cooperate with said one pin in guiding said balls to and fro between said conduit and the associated end of said ball race.

3. A ball bearing screw and nut mechanism, comprising a screw having an external helical groove, a nut formed with an internal helical groove, said grooves cooperating with each other to form a single turn helical ball race, a plurality of balls mounted in said race and serving to hold said nut and screw in assembled relation, a conduit formed generally longitudinally in said nut in juxtaposed position to the ends of said single turn ball race and opening respectively into the associated ends of said ball race, a pair of deflector pins mounted in said nut at each end of said conduit and cooperating to provide for the smooth transfer of said balls between said conduit and said single turn ball race and to prevent said balls from rolling outwardly from the ends of said conduit.

4. The invention defined in claim 3 characterized in that said conduit comprises a bore of substantially uniform diameter from end to end thereof and opening through the opposite face of said nut.

5. A ball bearing nut and screw mechanism comprising a screw having an external helical groove, a nut assembled over said screw having a similar helical groove opening inwardly toward said screw from the inner annular surface thereof and cooperating with said screw to form a single convolution ball race, an elongated open-faced channel formed in said nut opening into the inner annular surface thereof and interconnecting the opposite ends of said single turn ball race to form a ball return passage across the crest of the helical wall on said screw separating adjacent convolutions of said helical groove, the longitudinal axis of said ball return passage lying at an angle to the axis of said screw, a series of spaced-apart balls located in said single convolution ball race and in said ball return passage, and pin means including a pair of pins carried by said nut at the intersection of the opposite ends of said single convolution race and the opposite ends of said ball return passage one of which extends into said helical groove in the path of said balls and effective as a ball pick-up, the other pin of each pair being effective to transfer said balls individually over the crest of said helical wall and in contact therewith and thereby effect the smooth and direct transfer of said balls from one end of said single turn race back to the other end thereof.

6. A ball bearing nut and screw mechanism as defined in claim 5 characterized in that said pin means includes a pair of similar pins fixed to said nut, the inner ends of said pins being inclined to the radius of said nut and offset laterally from the longitudinal center line of said helical groove with their inner ends converging toward one another to aid in picking said balls out of said screw groove and shifting the same laterally over the crest of said helical wall.

7. A ball bearing nut and screw mechanism as defined in claim 5 characterized in that said nut is formed in one piece and in that the opposite ends of said ball return passage are spaced axially inwardly from the opposite end faces of said nut.

8. A ball bearing nut and screw mechanism as defined in claim 5 characterized in that said ball return passage is open throughout the length thereof to the juxtaposed surface of said screw and in that the maximum depth thereof is radially opposite the crest of said helical wall and is only slightly greater than the diameter of said balls.

9. A ball bearing nut and screw mechanism comprising a screw having an external helical groove, a nut assembled over said screw having a similar helical groove opening inwardly toward said screw from the inner annular surface thereof and cooperating with said screw to form a helical ball race, a cylindrical bore extending crosswise of the body of said nut and opening through the opposite side faces thereof and intersecting said helical groove in said nut to form a ball return passage interconnecting the opposite ends of said helical ball race formed between said nut and screw, closely spaced balls arranged along said helical ball race and through said ball return passage, and a pair of pins carried by said nut adjacent the opposite ends of said ball return passage effective to close the opposite ends of said bore and to effect the transfer of said balls out of one end of said helical ball race, through said ball return passage and back into the other end of said ball race.

10. A ball bearing nut and screw mechanism as defined in claim 9 characterized in that said ball return passage is open throughout the length thereof to the juxtaposed surface area of said screw.

11. A ball bearing nut and screw mechanism as defined in claim 9 characterized in that the axis of said ball return passage lies in a plane parallel to the screw axis but with the direction of said ball axis traversing the direction of the screw axis.

12. A ball bearing nut and screw mechanism as defined in claim 9 characterized in that said ball return passage is inclined in a direction traversing said screw axis and in such manner that the length of said single turn convolution is somewhat less than 360 degrees in length.

13. A ball bearing nut and screw mechanism as defined in claim 9 characterized in that one pair of said pins have the inner ends thereof converging toward one another and the juxtaposed portions of said screw groove, and the other pair of pins being laterally offset away from one another to one side of the longtitudinal center line of said single convolution ball race.

14. A ball bearing nut and screw mechanism as defined in claim 13 characterized in that said last-mentioned other pair of pins are disposed generally radially of said nut.

References Cited in the file of this patent

UNITED STATES PATENTS

| | | |
|---|---|---|
| 2,298,011 | Hofar | Oct. 6, 1942 |
| 2,473,743 | Barnes | June 21, 1946 |
| 2,478,510 | Stolpe | Aug. 9, 1949 |
| 2,618,166 | Douglas | Nov. 18, 1952 |
| 2,714,821 | Orner | Aug. 9, 1955 |